US010062471B2

(12) United States Patent
Posselt et al.

(10) Patent No.: US 10,062,471 B2
(45) Date of Patent: *Aug. 28, 2018

(54) ADDITIVE FORMULATION SUITABLE FOR ANTISTATIC MODIFICATION AND IMPROVING THE ELECTRICAL CONDUCTIVITY OF INANIMATE ORGANIC MATERIAL

(71) Applicant: BASF SE, Ludwigshafen (DE)

(72) Inventors: Dietmar Posselt, Heidelberg (DE); Frank-Olaf Maehling, Mannheim (DE); Arno Lange, Bad Duerkheim (DE); Anja Vinckier, Antwerp (BE); Claudius Kormann, Schifferstadt (DE)

(73) Assignee: BASF SE, Ludwigshafen (DE)

( * ) Notice: Subject to any disclaimer, the term of this patent is extended or adjusted under 35 U.S.C. 154(b) by 247 days.

This patent is subject to a terminal disclaimer.

(21) Appl. No.: 14/329,034

(22) Filed: Jul. 11, 2014

(65) Prior Publication Data
US 2014/0318002 A1    Oct. 30, 2014

Related U.S. Application Data

(60) Division of application No. 13/856,994, filed on Apr. 4, 2013, now Pat. No. 8,858,838, which is a continuation of application No. 12/527,970, filed as application No. PCT/EP2008/052451 on Feb. 28, 2008, now Pat. No. 8,551,365.

(30) Foreign Application Priority Data

Mar. 2, 2007  (EP) ..................... 07103421

(51) Int. Cl.
H01B 1/12       (2006.01)
C08G 75/18      (2006.01)
C08G 75/22      (2006.01)
C08L 81/06      (2006.01)
C10L 1/14       (2006.01)
C10L 1/22       (2006.01)
C10L 1/24       (2006.01)
A61K 8/02       (2006.01)
C10M 157/06     (2006.01)
C10M 161/00     (2006.01)
C08L 39/04      (2006.01)
C10L 1/16       (2006.01)
C10L 1/222      (2006.01)
C10L 1/236      (2006.01)
C10L 1/2383     (2006.01)
C10L 1/2387     (2006.01)

(52) U.S. Cl.
CPC ............. H01B 1/125 (2013.01); C08G 75/18 (2013.01); C08G 75/22 (2013.01); C08L 81/06 (2013.01); C10L 1/143 (2013.01); C10L 1/2431 (2013.01); C10M 157/06 (2013.01); C10M 161/00 (2013.01); C08L 39/04 (2013.01); C10L 1/1616 (2013.01); C10L 1/2225 (2013.01); C10L 1/2364 (2013.01); C10L 1/2383 (2013.01); C10L 1/2387 (2013.01); C10L 1/2437 (2013.01); C10L 1/2475 (2013.01); C10M 2203/065 (2013.01); C10M 2205/02 (2013.01); C10M 2205/0206 (2013.01); C10M 2219/044 (2013.01); C10M 2221/04 (2013.01); C10M 2221/0405 (2013.01); C10N 2230/28 (2013.01); C10N 2230/66 (2013.01); C10N 2240/04 (2013.01); C10N 2240/10 (2013.01); C10N 2260/09 (2013.01)

(58) Field of Classification Search
None
See application file for complete search history.

(56) References Cited

U.S. PATENT DOCUMENTS 3,522,179 A    7/1970   Le Suer
3,917,466 A    11/1975  Henry, Jr.
4,234,435 A    11/1980  Meinhardt et al.
4,356,002 A    10/1982  Knepper et al.
(Continued)

FOREIGN PATENT DOCUMENTS

DE    38 26 608    2/1990
DE    38 38 918    5/1990
(Continued)

OTHER PUBLICATIONS

Sandler, et al., "Olefin-Sulfer Dioxide Copolymers", Polymer Syntheses, vol. 3, Chapter 1, pp. 1-41, (Jan. 1, 1980).

Primary Examiner — Lorna M Douyon
(74) Attorney, Agent, or Firm — Oblon, McClelland, Maier & Neustadt, L.L.P.

(57) ABSTRACT

An additive formulation suitable for antistatic modification and improving the electrical conductivity of inanimate organic material, consisting essentially of
(A) from 1 to 50% by weight of an olefin-sulfur dioxide copolymer,
(B) from 1 to 50% by weight of a compound which comprises one or more basic nitrogen atoms and has at least one relatively long-chain linear or branched hydrocarbon radical having at least four carbon atoms or an equivalent structural element which ensures the solubility of component (B) in the inanimate organic material,
(C) from 0.1 to 30% by weight of an oil-soluble acid and
(D) from 1 to 80% by weight of a high-boiling organic solvent which consists of one or more molecule types, where at least 80% by weight of these molecule types have a boiling point of more than 150° C. at standard pressure,
where the sum of all components adds up to 100% by weight.

12 Claims, No Drawings

(56) References Cited

U.S. PATENT DOCUMENTS

| | | | |
|---|---|---|---|
| 4,416,668 A | 11/1983 | Thompson | |
| 4,537,601 A | 8/1985 | Naiman | |
| 4,849,572 A | 7/1989 | Chen et al. | |
| 4,877,416 A | 10/1989 | Campbell | |
| 4,904,401 A | 2/1990 | Ripple et al. | |
| 5,006,279 A * | 4/1991 | Grobbel | C09D 9/00 134/38 |
| 5,569,644 A | 10/1996 | Geibach et al. | |
| 5,725,611 A | 3/1998 | Wright et al. | |
| 5,876,468 A | 3/1999 | Moreton | |
| 6,165,235 A | 12/2000 | Kolp et al. | |
| 6,353,143 B1 * | 3/2002 | Fang | C10L 1/06 585/1 |
| 6,391,070 B2 | 5/2002 | Schield | |
| 8,551,365 B2 * | 10/2013 | Posselt | C08G 75/22 252/500 |
| 8,858,838 B2 * | 10/2014 | Posselt | C08G 75/22 252/500 |
| 2001/0048099 A1 | 12/2001 | Schield | |
| 2003/0192233 A1 | 10/2003 | Caprotti et al. | |
| 2004/0123517 A1 * | 7/2004 | Caprotti | C10L 1/14 44/385 |
| 2005/0183325 A1 | 8/2005 | Sutkowski | |
| 2007/0027041 A1 | 2/2007 | Krull et al. | |
| 2007/0220803 A1 * | 9/2007 | Henry, Jr. | C08L 79/02 44/370 |
| 2008/0178523 A1 | 7/2008 | Ahlers et al. | |
| 2008/0196300 A1 | 8/2008 | Lange et al. | |
| 2009/0065744 A1 | 3/2009 | Lange et al. | |
| 2009/0077869 A1 * | 3/2009 | Schwab | C10L 1/143 44/370 |

FOREIGN PATENT DOCUMENTS

| | | |
|---|---|---|
| DE | 41 42 241 | 6/1993 |
| DE | 43 09 074 | 9/1994 |
| DE | 196 20 262 | 11/1997 |
| DE | 101 02 913 | 7/2002 |
| EP | 0 244 616 | 11/1987 |
| EP | 0 307 815 | 3/1989 |
| EP | 0 310 875 | 4/1989 |
| EP | 0 356 725 | 3/1990 |
| EP | 0 452 328 | 10/1991 |
| EP | 0 476 485 | 3/1992 |
| EP | 0 548 617 | 6/1993 |
| EP | 0 639 632 | 2/1995 |
| EP | 0 700 985 | 3/1996 |
| EP | 0 831 141 | 3/1998 |
| EP | 1 233 990 | 8/2002 |
| EP | 1 226 188 | 12/2004 |
| EP | 1 274 819 | 6/2005 |
| EP | 1 568 756 | 8/2005 |
| EP | 1 749 874 | 2/2007 |
| WO | 87 01126 | 2/1987 |
| WO | 94 24231 | 10/1994 |
| WO | 96 03367 | 2/1996 |
| WO | 9603476 | 2/1996 |
| WO | 97 03946 | 2/1997 |
| WO | 00 47698 | 8/2000 |
| WO | 2007 012580 | 2/2007 |
| WO | 2007 099048 | 9/2007 |
| WO | WO 2007/110780 A2 * | 10/2007 |

\* cited by examiner

ADDITIVE FORMULATION SUITABLE FOR ANTISTATIC MODIFICATION AND IMPROVING THE ELECTRICAL CONDUCTIVITY OF INANIMATE ORGANIC MATERIAL

This application is a divisional application of U.S. Ser. No. 13/856,994 filed on Apr. 4, 2013, now U.S. Pat. No. 8,858,838, which is a continuation application of U.S. Ser. No. 12/527,970 filed on Aug. 20, 2009, now U.S. Pat. No. 8,551,365, which is a National Stage application of PCT/EP08/52451 filed on Feb. 28, 2008, each of which are incorporated by reference. This application also claims the benefit of priority of EPO 07103421.9 filed on Feb. 2, 2007.

DESCRIPTION

The present invention relates to a novel and improved additive formulation which is suitable for antistatic modification and improving the electrical conductivity of inanimate organic material, and for preventing electrostatic charge in the course of chemical and physical processes. The present invention further relates to a process for preparing this additive formulation. The present invention further relates to the use of this additive formulation and to inanimate organic material modified antistatically with it. The present invention further relates to a process for preparing olefin-sulfur dioxide copolymers with a low residual olefin content, which can be used advantageously as a component in this additive formulation.

Inanimate organic material, for example a fuel, is generally a very poor electrical conductor. Electrical charges therefore tend to accumulate locally in such organic material and discharge as sparks in an uncontrolled manner, which can lead to explosions or fires on contact of this organic material, which is usually combustible and often highly inflammable, with air or oxygen. Suitable antistatic additives allow the electrical conductivity of inanimate organic materials to be increased, so that static charges can no longer form and the risk of explosions and fires is reduced.

U.S. Pat. No. 3,917,466 (1) discloses additive formulations for antistatic modification and improving electrical conductivity, which consists of olefin-sulfur dioxide copolymers, polymeric polyamines which are obtainable by reacting epichlorohydrin with aliphatic monoamines or polyamines, for example N-tallowfat-1,3-diaminopropane, oil-soluble sulfonic acids and low-boiling solvents such as toluene and/or isopropanol.

U.S. Pat. No. 4,416,668 (2) describes mixtures of α-olefin-maleimide copolymers and olefin-sulfur dioxide copolymers as antistats for organic liquids such as fuels. These mixtures may comprise solvents such as benzene, toluene or xylenes.

The efficacy of the antistats described in the prior art is, however, still unsatisfactory. There is a need for an even more effective and longer-lasting increase in the electrical conductivity in inanimate organic material. Moreover, the antistats should have an even higher thermal stability. For toxicity and environmental reasons, they should as far as possible be metal- and halogen-free. They should not least have a maximum flashpoint, in order that they can be handled safely, i.e. without explosion and fire risk, in the course of their preparation, their transport and their storage before use in the inanimate organic material.

It was therefore an object of the invention to provide antistats which are uncontroversial from toxicity and environmental viewpoints for increasing the electrical conductivity in inanimate organic material, especially in fuels and mineral oil products, with an effective action, a high thermal stability and a maximum flashpoint.

Accordingly, an additive formulation has been found, which is suitable for antistatic modification and improving the electrical conductivity of inanimate organic material and consists essentially of (A) from 1 to 50% by weight of an olefin-sulfur dioxide copolymer,
(B) from 1 to 50% by weight of a compound which comprises one or more basic nitrogen atoms and has at least one relatively long-chain linear or branched hydrocarbon radical having at least four carbon atoms or an equivalent structural element which ensures the solubility of component (B) in the inanimate organic material,
(C) from 0.1 to 30% by weight of an oil-soluble acid and
(D) from 1 to 80% by weight of a high-boiling organic solvent which consists of one or more molecule types, where at least 80% by weight of these molecule types have a boiling point of more than 150° C. at standard pressure, where the sum of all components (including secondary components which may be present and/or nondisruptive impurities) adds up to 100% by weight.

The inventive additive formulation may—usually as a result of production—comprise, as secondary components and/or nondisruptive impurities, up to 10% by weight, especially up to 5% by weight, in particular up to 2% by weight, of further ingredients.

In a preferred embodiment, the inventive additive formulation consists essentially of (A) from 10 to 30% by weight, especially from 13 to 25% by weight, of component (A),
(B) from 10 to 30% by weight, especially from 13 to 25% by weight, of component (B),
(C) from 2 to 15% by weight, especially from 4 to 10% by weight, of component (C) and
(D) from 40 to 78% by weight, especially from 50 to 70% by weight, of component (D).

The inventive additive formulation described constitutes a concentrate of the actual active components (A), (B) and (C) in high-boiling organic solvents (D), which is highly suitable for safe transport and safe storage of the product.

The structure and the known preparation processes for the olefin-sulfur dioxide copolymer of component (A) are described in documents (1) and (2). Component (A) is preferably a copolymer of sulfur dioxide with one or more linear or branched 1-olefins having from 2 to 24 carbon atoms. Typically, the copolymers (polysulfones) of component (A) are alternating 1:1 copolymers in which one sulfone unit generally follows one olefin unit; it is also possible for sequences of two or more olefin units to occur in small amounts. Some of the olefin monomers may be replaced by ethylenically unsaturated carboxylic acids (e.g. acrylic acid, methacrylic acid or vinylacetic acid) or ethylenically unsaturated dicarboxylic acids (e.g. maleic acid or fumaric acid) or derivatives thereof (e.g. maleic anhydride), so that the copolymer of component (A) is formed especially from 50 mol % of sulfur dioxide or sulfone units, from 40 to 50 mol % of olefin units and from 0 to 10 mol % of units from said ethylenically unsaturated carboxylic acids, ethylenically unsaturated dicarboxylic acids or derivatives thereof.

Useful branched and especially linear 1-olefins having from 2 to 24 carbon atoms for preparing component (A) include, for example, ethene, propene, 1-butene, 2-butene, isobutene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene or mixtures thereof. Particular preference is given to linear 1-olefins having from 6 to 16 carbon atoms, especially having from 8 to 14 carbon atoms, or linear 1-olefins having from 12 to 22 carbon atoms, especially from 14 to 20 carbon atoms, and also mixtures thereof, for example a mixture of 1-dodecene and 1-tetradecene. It may also be advantageous to use mixtures of low molecular weight and high molecular weight 1-olefins, i.e. 1-olefin mixtures with a bimodal distribution, to prepare component (A), for example mixtures of 1-olefins having from 6 to 13 carbon atoms and 1-olefins having from 14 to 20 carbon atoms, or mixtures of 1-olefins having from 6 to 10 carbon atoms and 1-olefins having from 11 to 15 carbon atoms, or mixtures of 1-olefins having from 2 to 24 carbon atoms and a single 1-olefin having from 4 to 10 carbon atoms. When technical or other 1-olefin mixtures are used, the specification of the carbon atoms within the ranges specified above is based on the mean carbon atom number of these mixtures, where the mean carbon atom number is the sum over the mathematical products of fraction by weight and corresponding carbon atom number of all 1-olefins present in the mixture.

The olefin-sulfur dioxide copolymer of component (A) typically has a number-average molecular weight $M_n$ of from 2000 to 1000000, especially from 4000 to 100000, in particular from 6000 to 25000. The polydispersity ($PDI=M_w/M_n$) is generally in the range from 1.1 to 30, especially from 1.5 to 20, in particular from 2 to 10, most preferably from 2.3 to 5.

Document (1) recommends the preparation of the olefin-sulfur dioxide copolymers by a suitable free-radical polymerization process in the temperature range from 0 to 50° C.; the solvents to be used are benzene, toluene or xylene; only a low molar excess of sulfur dioxide (a maximum of 1.5 times the molar amount) is employed; free-radical initiators such as peroxides or azo compounds and the additional irradiation with actinic light are recommended. According to document (2), the olefin-sulfur dioxide copolymers can be prepared by emulsion polymerization processes in aqueous medium. Both preparation methods are, however, in need of improvement, and the use of the olefin-sulfur dioxide copolymers thus obtained in the inventive additive formulation leads to disadvantages in their handling and efficacy. In particular, the content of volatile and combustible starting olefins is still too high, such that the flashpoint of the resulting antistat additive formulation is too low. There was thus the need for an improved preparation process for the olefin-sulfur dioxide copolymers in order to make their use in the inventive additive formulation problem-free.

Accordingly, in the context of the present invention, a process has been found for preparing olefin-sulfur dioxide copolymers which comprise less than 15 mol %, preferably less than 10 mol %, especially less than 7 mol %, in particular less than 5 mol %, of olefin not converted in the copolymerization with the sulfur dioxide, which comprises using the sulfur dioxide in an at least 1.4-fold molar excess, especially a 1.6-fold molar excess, and performing the polymerization in a high-boiling inert organic solvent which consists of one or more molecular types, where at least 50% by weight of these molecule types have more than 8 carbon atoms. Preference is given to using the sulfur dioxide in an at least 1.8-fold molar excess, especially in a 1.8- to 2.5-fold molar excess, and to performing the polymerization in a high-boiling inert organic solvent which consists of one or more molecule types, where at least 80% by weight of these molecule types have from 9 to 30 carbon atoms. Advantageously, a high-boiling organic solvent is used here, especially a high-boiling aromatic hydrocarbon having from 9 to 30 carbon atoms or a mixture of such high-boiling aromatic hydrocarbons, as defined for the present invention as component (D). Preference is given to carrying out the reaction at from 10 to 40° C., especially at from 15 to 29° C., over a period of from 0.5 to 24 hours.

Accordingly, in the context of the present invention, a further process has been found for preparing olefin-sulfur dioxide copolymers which comprise less than 15 mol %, preferably less than 10 mol %, especially less than 7 mol %, in particular less than 5 mol %, of olefin not converted in the copolymerization with the sulfur dioxide, which comprises using the sulfur dioxide in an at least 1.1-fold molar excess and performing the polymerization at from 15 to 38° C., especially at from 20 to 30° C., under autogenous pressure. Preference is given to using the sulfur dioxide in an at least 1.4-fold molar excess, especially in an at least 1.6-fold molar excess, in particular in an at least 1.8-fold molar excess, more preferably in a from 1.8- to 2.5-fold or a from 1.4- to 2.5-fold molar excess, and to carrying out the polymerization in a high-boiling inert organic solvent which consists of one or more molecule types, where at least 80% by weight of these molecule types have from 9 to 30 carbon atoms. Advantageously, a high-boiling organic solvent is used here too, especially a high-boiling aromatic hydrocarbon having from 9 to 30 carbon atoms or a mixture of such high-boiling aromatic hydrocarbons, as defined as component (D) for the present invention.

In a preferred embodiment of the latter process for preparing olefin-sulfur dioxide copolymers, the polymerization is performed in a first stage over a period of from 0.5 to 5 hours at from 30 to 38° C. under autogenous pressure, and thereafter in a second stage over a period of from 1 to 5 hours at from 20 to 29° C. under autogenous pressure.

In many cases, the alternative preparation of the former or of the latter process for preparing olefin-sulfur dioxide copolymers is sufficient to achieve the desired improvement in the process, especially with regard to the increase in the flashpoint of the resulting antistat additive formulation. However, it is also possible to combine the two processes, i.e. the sulfur dioxide can be used in an at least 1.6-fold molar excess and the polymerization can be performed in a high-boiling inert organic solvent which consists of one or more molecule types, where at least 50% by weight of these molecule types have more than 8 carbon atoms, and at from 15 to 38° C. under autogenous pressure. In all alternatives mentioned, it is possible to dispense with irradiation with actinic light, which would be performable only at great cost and inconvenience on the industrial scale in particular.

The described polymerization of sulfur dioxide with the olefin proceeds generally by a free-radical mechanism. Such a free-radical polymerization is performed by the customary methods. For this purpose, the customary free-radical initiators are used, especially those based on peroxides or azo compounds, for example di-tert-butyl peroxide, tert-butyl peroxypivalate or azobisisobutyronitrile. To control the molecular weight to be achieved, it is possible also to use regulators, for example mercaptans such as dodecyl mercaptan.

The improved process described for preparing olefin-sulfur dioxide copolymers achieves virtually complete conversion of the olefin.

The compound of component (B) which comprises one or more basic nitrogen atoms must be soluble, but at least homogeneously distributable, in the inanimate organic material to be treated with the inventive additive formulation. Component (B) is in many cases likewise a polymer. It has at least one relatively long-chain branched or especially linear hydrocarbon radical having at least 4 carbon atoms, preferably having at least 8 carbon atoms, especially having at least 12 carbon atoms, in particular having from 12 to 30 carbon atoms, provided that solubility in the inanimate organic material is not ensured by an equivalent structural element. The compound of component (B) preferably does not comprise any free hydroxyl groups because they might impair the efficacy of the inventive additive formulation under some circumstances.

In the compound of component (B), said relatively long-chain branched or linear hydrocarbon radical may be on the basic nitrogen atom or on one of the basic nitrogen atoms or on a carbon atom, especially on a carbon atom of the main polymer chain in polymeric structures. Typical relatively long-chain branched or linear hydrocarbon radicals are, for example, linear alkyl radicals as occur in fatty acids, and polyisobutyl radicals, especially those having from 20 to 150 carbon atoms, in particular from 35 to 100 carbon atoms.

Suitable oligomeric or polymeric structure types for component (B) with such relatively long-chain hydrocarbon radicals are, for example, reaction products of oligoethyleneamines or oligoethyleneimines with alkyl halides, polyethyleneimines with polyisobutenylsuccinic anhydrides, ethylene-vinyl acetate-amino(meth)acrylate terpolymers and especially olefin-maleic anhydride copolymers derivatized with amines or polyamines, in particular α-olefin-maleimide copolymers having at least one basic nitrogen atom.

A typical example of a reaction product of an oligoethyleneamine with an alkyl halide is the reaction product of comblike structure formed from decaethyleneundecamine and a multiple molar excess of n-hexadecyl chloride.

Suitable nonpolymeric structure types for component (B) with such relatively long-chain hydrocarbon radicals are, for example, trialkylammonium fatty acid salts, for example trialkylammonium oleates, and polyisobutenylsuccinimides.

Suitable structure types for component (B) without relatively long-chain hydrocarbon radicals are, for example, polyethyleneimines and polyvinylamines in which the specific, typically crosslinked polymer structure ensures the desired solubility properties.

The structure and the preparation process for the particularly preferred α-olefin-maleimide copolymers with at least one basic nitrogen atom of component (B) are described in principle in document (2). In a preferred embodiment, these α-olefin-maleimide copolymers are obtainable by free-radical polymerization of one or more linear or branched α-olefins having from 6 to 50 carbon atoms with maleic anhydride and subsequent reaction with one or more aliphatic polyamines. The α-olefin-maleic anhydride copolymers and the α-olefin-maleimide copolymers prepared therefrom are typically 1:1 copolymers alternating in the main polymer chain, in which one maleic acid unit always follows one α-olefin unit. As a result of the relatively long-chain branched or linear hydrocarbon radicals, comb structures generally arise.

Useful branched and especially linear 1-olefins having from 6 to 50 carbon atoms for preparing the α-olefin-maleimide copolymers of component (B) are, for example, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octa-decene, 1-nonadecene, 1-eicosene, 1-heneicosene, 1-docosene, 1-tricosene, 1-tetracosene, 1-triacontene, 1-tetracontene, 1-pentacontene or mixtures thereof. Particular preference is given to linear 1-olefins having from 12 to 30 carbon atoms, especially having from 16 to 24 carbon atoms, and mixtures thereof.

The free-radical polymerization of the 1-olefins with maleic anhydride is performed by the customary methods. For this purpose, the customary free-radical initiators are used, especially those based on peroxides or azo compounds, for example di-tert-butyl peroxide, tert-butyl peroxypivalate or azobisisobutyronitrile, the customary temperature and pressure ranges are employed, for example from 50 to 150° C. at standard pressure, and the reactions are performed in the customary solvents, for example aromatic hydrocarbons. The solvents used are preferably the high-boiling organic solvents of component (D) of the present invention.

On completion of polymerization, the resulting α-olefin-maleic anhydride copolymers are reacted with one or more aliphatic polyamines to give the corresponding imide. Polyamines with a primary amino group are required for the imide formation, and at least one further primary, secondary or tertiary amino group for the basic nitrogen atom. Suitable examples in this context are relatively short-chain diamines such as ethylenediamine, 1,3-propylenediamine, 3-(N,N-dimethylamino)propylamine ("DMAPA") or bis[3-(N,N-dimethylamino)propyl]amine ("bis-DMAPA") or relatively long-chain diamines such as tallow fat-1,3-diaminopropane. The customary reaction conditions for this imide formation are known to those skilled in the art. When solvents are additionally used for this imide formation, preference is given to using the high-boiling organic solvents of component (D) of the present invention.

Typical examples of α-olefin-maleic anhydride copolymers reacted with aliphatic polyamines are the reaction products which have a comblike structure formed from $C_{20/24}$-α-olefin maleic anhydride copolymers and 3-(N,N-dimethylamino)propylamine ("DMAPA") or bis[3-(N,N-dimethylamino)propyl]amine ("bis-DMAPA").

The described α-olefin-maleimide copolymers having at least one basic nitrogen atom of component (B) typically have a weight-average molecular weight $M_w$ of from 500 to 50000, especially from 1000 to 10000. A typical α-olefin-maleimide copolymer is an α-olefin-maleic anhydride copolymer which has been reacted with tallow fat-1,3-diaminopropane to give the imide and has a weight-average molecular weight $M_w$ in the range from 1000 to 10000.

The oil-soluble acid of component (C) is preferably an organic sulfonic acid which, to achieve the oil solubility, appropriately has a relatively long-chain or relatively voluminous hydrocarbyl radical, especially having from 6 to 40 carbon atoms, in particular from 8 to 32 carbon atoms, more preferably having from 10 to 24 carbon atoms. Suitable such hydrocarbyl radicals are linear or branched alkyl or alkenyl radicals, e.g. n-hexyl, n-heptyl, n-octyl, 2-ethylhexyl, n-nonyl, n-decyl, 2-propylheptyl, n-undecyl, n-dodecyl, n-tridecyl, isotridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, oleyl, linolyl or linolenyl, cycloalkyl radicals, e.g. cyclohexyl, methyl-cyclohexyl or dimethylcyclohexyl, aryl radicals, e.g. phenyl or naphthyl, aralkyl radicals, e.g. benzyl or 2-phenylethyl, or more preferably alkaryl radicals, especially phenyl or naphthyl substituted by linear or branched $C_1$- to $C_{18}$-alkyl groups, e.g. tolyl, xylyl, n-nonylphenyl, n-decylphenyl, n-dodecylphenyl, isotridecylphenyl, n-nonylnaphthyl, di-n-nonylnaphthyl, n-decylnaphthyl, di-n-decylnaphthyl, n-dodecylnaphthyl, di-n-dodecylnaphthyl, isotridecylnaphthyl or diisotridecylnaphthyl. In the latter monosubstituted phenyl radicals, the alkyl groups may be in the ortho, meta or para position to the sulfonic acid group, preference being given to para orientation. Typical examples of component (C) are therefore n-nonylbenzenesulfonic acid, n-decyl-benzenesulfonic acid, n-dodecylbenzenesulfonic acid, isotridecylbenzenesulfonic acid, n-nonylnaphthylsulfonic acid, di-n-nonylnaphthylsulfonic acid, n-decylnaphthylsulfonic acid, di-n-decylnaphthylsulfonic acid, n-dodecylnaphthylsulfonic acid, di-n-dodecylnaphthylsulfonic acid, isotridecylnaphthylsulfonic acid and diisotridecylnaphthylsulfonic acid.

In addition to the organic sulfonic acids mentioned, it is also possible in principle to use, as component (C), for example, oil-soluble organic sulfinic acids or organic phosphonic acids which likewise appropriately have a relatively long-chain or relatively voluminous hydrocarbyl radical, especially one having from 6 to 40 carbon atoms, in particular from 8 to 32 carbon atoms, more preferably having from 10 to 24 carbon atoms.

The high-boiling organic solvent of component (D) is not an actual active component in the inventive additive formulation for antistatic modification and improving the conductivity of inanimate organic material, but, through its interaction with components (A), (B) and (C), promotes an enhances its action, contributes to the thermal stability of the formulation and ensures a high flashpoint. Moreover, component (D) also serves for the better establishment of the desired viscosity of the inventive additive formulation, which constitutes an important criterion for the usability of this formulation.

In a preferred embodiment, component (D) consists to an extent of from at least 80% by weight, in particular to an extent of at least 90% by weight, of a high-boiling aromatic hydrocarbon having from 9 to 30 carbon atoms or a mixture of such high-boiling aromatic hydrocarbons. Most preferably, component (D) is, to an extent of at least 80% by weight, especially to an extent of at least 90% by weight, in particular to an extent of 100% by weight, a mixture of high-boiling aromatic hydrocarbons having from 9 to 20 carbon atoms, especially from 9 to 14 carbon atoms. Such aromatic hydrocarbons are in particular bicyclic, tricyclic or polycyclic aromatics, for example naphthalene, diphenyl, anthracene or phenanthrene, or mono-, bicyclic, tricyclic or polycyclic aromatics with aliphatic side chains, for example substituted benzenes with $C_7$- to $C_{14}$-alkyl side chains, especially $C_7$- to $C_{12}$-alkyl side chains, such as n-dodecylbenzene or n-tetradecylbenzene, but in particular with $C_1$- to $C_6$-alkyl side chains, for example n-propylbenzene, isopropylbenzene, ethylmethylbenzenes, trimethylbenzenes, ethyldimethylbenzenes, diethylbenzenes, n-butylbenzene, isobutylbenzene, sec-butylbenzene, tert-butylbenzene, n-pentylbenzene, tert-pentylbenzene, n-hexylbenzene, methylnaphthalenes, di methylnaphthalenes or $C_2$- to $C_6$-alkyl-naphthalenes. All aromatic hydrocarbons mentioned have boiling points above 150° C. at standard pressure, generally in the range from more than 150° C. to 330° C. at standard pressure.

Mixtures of the aromatic hydrocarbons mentioned with 9 or more carbon atoms are commercially available as technical solvent cuts, for example from ExxonMobil Chemical under the names Solvesso® 100 ($C_9$ to $C_{10}$ aromatic cut), Solvesso® 150 ($C_{10}$ to $C_{11}$ aromatic cut) and Solvesso® 200 ($C_{10}$ to $C_{14}$ aromatic cut); such a $C_{10}$ to $C_{11}$ aromatic cut is also referred to as "Solvent Naphtha Heavy".

In addition to the aromatic hydrocarbons mentioned with 9 or more carbon atoms, component (D) in the preferred embodiment described may comprise from 0 to less than 20% by weight of nonaromatic organic solvent components (for example long-chain paraffins and/or alicyclic compounds and/or heterocyclic compounds with boiling points of in each case more than 100° C., in particular more than 130° C.) and/or aromatic solvent components having less than 9 carbon atoms (for example toluene or xylenes).

The inventive additive formulation is appropriately prepared from components (A), (B), (C) and (D) by mixing. In principle, any conceivable sequence of mixing allows the inventive additive formulation to be obtained. However, it has been found to be preferable in relation to the practical performability of the mixing that components (A) and (C) are first mixed homogeneously with one another in the presence of at least a portion of the high-boiling organic solvent (D), and then component (B) is incorporated. It may also be advantageously to perform the mixing operations at slightly elevated temperatures, for instance at from 20 to 80° C., in particular from 25 to 50° C. In a particularly preferred embodiment, components (A) and (C) are first mixed homogeneously with one another in the presence of at least some of the high-boiling organic solvent (D) at from 30 to 60° C., especially at from 40 to 55° C., and then component (B) is incorporated, the mixture of components (A) and (C) and some of the high-boiling organic solvent (D) being kept within the aforementioned temperature range preferably for at least 1 minute, especially for from 1 to 120 minutes, in particular for from 1 to 30 minutes, before component (B) is incorporated. It may also be advantageous to perform the mixing operations entirely or partly under reduced pressure, appropriately at from 100 mbar to less than 1 bar, in particular at from 10 mbar to less than 1 bar. All common mixing techniques and mixing units can be used.

The inventive additive formulation is used in the context of the present invention for antistatic modification and improving the electrical conductivity of inanimate organic material and for preventing electrostatic charge in chemical and physical processes.

To this end, the inventive additive formulation is incorporated or mixed into the inanimate organic material which is to be modified in an antistatic manner and thus to be made more electrically conductive during or after its production and distributed substantially homogeneously. The concentration of the inventive additive formulation in the inanimate organic material is generally from 0.01 to 2000 ppm by weight, preferably from 0.1 to 1000 ppm by weight, in particular from 0.5 to 500 ppm by weight, especially from 1 to 350 ppm by weight, based on the inanimate organic material. Especially in the case of use in fuels, the concentration of the inventive additive formulation may be lower; typical dosages there are from 0.01 to 1000 ppm by weight, preferably from 0.1 to 500 ppm by weight, in particular from 0.5 to 100 ppm by weight, especially from 1 to 10 ppm by weight, based on the fuel.

Inanimate organic material is understood to mean especially cosmetic preparations such as creams and lotions, medicament formulations such as pills and suppositories, photographic recording materials such as photographic emulsions, paints and varnishes, plastics, waxes, solvents, and also mineral oil products and fuels, especially diesel fuel, heating oil, gasoline fuel, aviation gasoline and turbine fuel, and also lubricants, i.e. motor oils, lubricant oils, hydraulic oils, turbine oils, regulator oils, transmission oils including manual and automatic oils, calendering oils, heat carrier oils, metalworking oils, shock absorber oils and lubricant greases.

Examples of plastics which can be modified antistatically with the inventive additive formulation include:

polymers of mono- or diolefins, such as low- or high-density polyethylene, polypropylene, linear polybutene-1, polyisoprene, polybutadiene and copolymers of mono- or diolefins or mixtures of the polymers mentioned; polystyrene and copolymers of styrene or alpha-methylstyrene with dienes and/or acrylic derivatives, for example styrene-butadiene, styrene-acrylonitrile (SAN), styrene-ethyl methacrylate, styrene-butadiene-ethyl acrylate, styrene-acrylonitrile methacrylate, acrylonitrile-butadiene-styrene (ABS) or methyl methacrylate-butadiene-styrene (MBS); halogenated polymers, for example polyvinyl chloride, polyvinyl fluoride, polyvinylidene fluoride and copolymers thereof;

polymers which derive from $\alpha,\beta$-unsaturated acids and derivatives thereof, such as polyacrylates, polymethacrylates, polyacrylamides and polyacrylonitriles;

polymers which derive from unsaturated alcohols and amines or from their acyl derivatives or acetals, for example polyvinyl alcohol and polyvinyl acetate;

polyurethanes (for example as a material for shoe soles), especially thermoplastic polyurethanes, polyamides, polyureas, polyphenylene ethers, polyesters, polycarbonates, polysulfones, polyether sulfones, polyether ketones and ethylene-vinyl acetate copolymers (for example also as a material for shoe soles).

The paints and varnishes which can be modified antistatically with the inventive additive formulation include paints such as alkyd resin paints, dispersion paints, epoxy resin paints, polyurethane paints, acrylic resin paints and cellulose nitrate paints, or varnishes such as wood protection varnishes.

The waxes which can be modified antistatically with the inventive additive formulation include the ethylene-vinyl acetate copolymer waxes.

Examples of solvents which can be modified antistatically with the inventive additive formulation and can thus be made more conductive include: alkanes such as n-pentane, n-hexane or n-heptane, alkenes such as hexene, heptene, octene, nonene, decene, undecene or dodecene, aromatics such as toluene or xylene, naphthenes, alcohols such as methanol, ethanol, isopropanol or tert-butanol, aldehydes such as acetaldehyde, propionaldehyde or butyraldehyde, ketones such as acetone or butanone, carboxylic acids such as formic acid, acetic acid or propionic acid, carboxylic esters such as methyl acetate or ethyl acetate, carboxamides such as N,N-dimethyl-formamide, and mixtures thereof.

The inventive additive formulation is suitable in a particularly advantageous manner for antistatic modification and improving the conductivity of turbine fuels (jet fuels). Turbine fuels are used in particular for the operation of aircraft turbines.

The customary turbine fuel composition comprises a majority of a liquid turbine fuel, which is, for example, a turbine fuel customary in civil or military aviation. This includes, for example, fuels of designation Jet Fuel A, Jet Fuel A-1, Jet Fuel B, Jet Fuel JP-4, JP-5, JP-7, JP-8 and JP-8+100. Jet A and Jet A-1 are commercially available kerosene-based turbine fuel specifications. The corresponding standards are ASTM D 1655 and DEF STAN 91-91. Jet B is a more narrowly cut fuel based on naphtha and kerosene fractions. JP-4 is equivalent to Jet B. JP-5, JP-7, JP-8 and JP-8+100 are military turbine fuels, as used, for example, by the marines and air force. Some of these standards designate formulations which already comprise further additives, such as corrosion inhibitors, icing inhibitors, further antistats such as static dissipaters, etc.

The inventive additive formulation can be added to the turbine fuel or the turbine fuel composition in combination with further additives known per se. Suitable additives which may be present in the turbine fuel composition comprise typically detergents, corrosion inhibitors, antioxidants such as sterically hindered tert-butylphenols, N-butylphenylenediamines or N,N'-diphenylamine and derivatives thereof, metal deactivators such as N,N'-disalicylidene-1,2-diaminopropane, solubilizers, further standard antistats such as Stadis® 450, biocides, anti-icing agents such as diethylene glycol methyl ether, and also mixtures of the additives mentioned.

Preferred additives for a turbine fuel or a turbine fuel composition are the specific compound classes (E), (F) and (G) listed below:

preferred additives (E) are compounds which are derived from succinic anhydride and have long-chain hydrocarbon radicals having generally from 15 to 700 carbon atoms, in particular from 30 to 200 carbon atoms. These compounds may have further functional groups which are preferably selected from hydroxyl, amino, amido and/or imido groups. Preferred additives are the corresponding derivatives of polyalkenylsuccinic anhydride which are obtainable, for example, by reacting polyalkenes with maleic anhydride by a thermal route or via the chlorinated hydrocarbons. The number-average molecular weight of the long-chain hydrocarbons is preferably within a range from about 200 to 10000, more preferably from 400 to 5000, in particular from 600 to 3000 and especially from 650 to 2000. These long-chain hydrocarbon radicals preferably derive from conventional polyisobutenes and especially from the aforementioned reactive polyisobutenes. Of particular interest as additives (E) are the derivatives of polyalkenylsuccinic anhydrides with ammonia, monoamines, polyamines, monoalcohols and polyols. Polyamines preferred for the derivatization comprise ethylenediamine, diethylenetriamine, triethylenetetramine, tetraethylenepentamine, propylenediamine, etc. Suitable alcohols comprise monohydric alcohols such as ethanol, allyl alcohol, dodecanol and benzyl alcohol, polyhydric alcohols such as ethylene glycol, diethylene glycol, propylene glycol, 1,2-butanediol, neopentyl glycol, glycerol, trimethylolpropane, erythritol, pentaerythritol, mannitol and sorbitol.

Succinic anhydride derivatives (E) suitable as additives are described for example in U.S. Pat. No. 3,522,179, U.S. Pat. No. 4,234,435, U.S. Pat. No. 4,849,572, U.S. Pat. No. 4,904,401, U.S. Pat. No. 5,569,644 and U.S. Pat. No. 6,165,235, which are fully incorporated here by reference.

Preferred additives (F) are polyalkenylthiophosphonate esters. The polyalkenyl radical of these esters preferably has a number-average molecular weight in the range from about 300 to 5000, more preferably from 400 to 2000 and especially from 500 to 1500. The polyalkenyl radical derives preferably from polyolefins as have already been described above as a long-chain hydrocarbon radical for component (E). These are especially polyalkenyl radicals which derive from conventional or reactive polyisobutenes. Suitable processes for preparing suitable polyalkenylthiophosphonate esters by reacting a polyolefin with a thiophosphorylating agent are described, for example, in U.S. Pat. No. 5,725,611, which is incorporated here by reference.

Preferred additives (G) are Mannich adducts. Such adducts are obtained in principle by Mannich reaction of aromatic hydroxyl compounds, especially phenol and phenol derivatives, with aldehydes and mono- or polyamines. They are preferably the reaction products of polyisobutene-substituted phenols with formaldehyde and mono- or polyamines such as ethylenediamine, diethylenetriamine, triethylenetetramine, tetraethylenepentamine, dimethylaminopropylamine, etc. Suitable Mannich adducts and processes for their preparation are described, for example, in U.S. Pat. No. 5,876,468, EP-A 831 141, EP-A 1 233 990 and EP-A 1 226 188, which are fully incorporated here by reference.

Further possible additives for a turbine fuel or a turbine fuel composition are the tetrahydrobenzoxazine stabilizers described in WO 2007/012580 and/or the polycyclic phenolic stabilizers described in international patent application PCT/EP2007/051632, which are fully incorporated here by reference.

The additives (E) to (G) and any further additives among those mentioned above may typically each be used in amounts of in each case from 0.0001 to 1% by weight, preferably from 0.001 to 0.6% by weight and in particular from 0.0015 to 0.4% by weight, based on the total amount of the turbine fuel composition.

The inventive additive formulation may be part of an additive concentrate for turbine fuels (jet fuels) which, as well as the inventive additive formulation, comprises at least one diluent and at least one further additive which is preferably selected from those described above. This additive concentrate, and thus also the turbine fuel composition additized with it, preferably comprises one or more additives from the group of (E), (F) and (G), especially also mixtures thereof such as (E)+(F), (E)+(G), (F)+(G) and (E)+(F)+(G).

Suitable diluents are, for example, the fractions obtained in mineral oil processing, such as kerosene, naphtha or mineral base oils. Additionally suitable are aromatic and aliphatic hydrocarbons such as Solvent Naphtha heavy, Solvesso® or Shellsol®, and also mixtures of these solvents and diluents.

The inventive additive formulation is present in the additive concentrate for turbine fuels described preferably in an amount of from 0.01 to 70% by weight, more preferably from 0.05 to 25% by weight and especially from 0.1 to 5% by weight, based on the total weight of the concentrate.

The inventive additive formulation described is also advantageously suitable for antistatic modification and improving the conductivity of aviation gasoline, gasoline fuels and mineral distillate fuels, and hear especially of diesel fuel and heating oil.

Aviation gasoline is a fuel developed specially for aviation engines, especially gasoline engines for propeller aircraft, which is similar to commercial gasoline fuels for operating land vehicles.

Useful gasoline fuels include all commercial gasoline fuel compositions. A typical representative which shall be mentioned here is the Eurosuper base fuel according to EN 228, which is customary on the market. Moreover, gasoline fuel compositions of the specification according to WO 00/47698 are also possible fields of use for the present invention. The gasoline fuels mentioned may also further comprise bioethanol.

Useful middle distillate fuels include all commercial diesel fuel and heating oil compositions. A typical representative which shall be mentioned here is the European diesel fuel according to EN 590, which is customary on the market. Diesel fuels are typically mineral oil raffinates which generally have a boiling range from 100 to 400° C. These are usually distillates having a 95% point up to 360° C. or even higher. They may also be so-called "ultra low sulfur diesel" or "city diesel", characterized by a 95% point of, for example, not more than 345° C. and a sulfur content of not more than 0.005% by weight, or by a 95% point of, for example, 285° C. and a sulfur content of not more than 0.001% by weight. In addition to the diesel fuels obtainable by refining, whose main constituents are relatively long-chain paraffins, suitable diesel fuels are those which are obtainable by coal gasification ["coal to liquid" (CTL) fuels] or gas liquefaction ["gas to liquid" (GTL) fuels]. Also suitable are mixtures of the aforementioned diesel fuels with renewable fuels such as biodiesel. Also suitable are diesel fuels obtained by biomass ["biomass to liquid" (BTL) fuels]. Of particular interest at the present time are diesel fuels with a low sulfur content, i.e. with a sulfur content of less than 0.05% by weight, preferably of less than 0.02% by weight, in particular of less than 0.005% by weight and especially of less than 0.001% by weight of sulfur. Diesel fuels may also comprise water, for example in an amount up to 20% by weight, for example in the form of diesel-water microemulsions or as so-called "white diesel".

Heating oils are, for example, low-sulfur or sulfur-rich mineral oil raffinates, or bituminous coal distillates or brown coal distillates, which typically have a boiling range of from 150 to 400° C. Heating oils may be standard heating oil according to DIN 51603-1 which has a sulfur content of from 0.005 to 0.2% by weight, or they are low-sulfur heating oils having a sulfur content of from 0 to 0.005% by weight. Examples of heating oil include in particular heating oil for domestic oil-fired boilers or EL heating oil.

The inventive additive formulation can either be added to the particular base fuel, especially the gasoline fuel or the diesel fuel, alone or in the form of fuel additive packages, for example the so-called gasoline or diesel performance packages. Such packages are fuel additive concentrates and comprise generally, as well as solvents, also a series of further components as coadditives, for example carrier oils, cold flow improvers, corrosion inhibitors, demulsifiers, dehazers, antifoams, cetane number improvers, combustion improvers, antioxidants or stabilizers, further antistats, metallocenes, metal deactivators, solubilizers, markers and/or dyes.

In a preferred embodiment, the additized gasoline or diesel fuel, as well as the inventive additive formulation, comprises, as further fuel additives, at least one detergent, referred to hereinafter as component (H).

Detergents or detergent additives (H) refer typically to deposition inhibitors for fuels. The detergents are preferably amphiphilic substances which have at least one hydrophobic hydrocarbon radical having a number-average molecular weight ($M_n$) of from 85 to 20000, especially from 300 to 5000, in particular from 500 to 2500, and have at least one polar moiety which is selected from (Ha) mono- or polyamino groups having up to 6 nitrogen atoms, at least one nitrogen atom having basic properties;

(Hb) nitro groups, if appropriate in combination with hydroxyl groups;

(Hc) hydroxyl groups in combination with mono- or polyamino groups, at least one nitrogen atom having basic properties;

(Hd) carboxyl groups or their alkali metal or alkaline earth metal salts;

(He) sulfonic acid groups or their alkali metal or alkaline earth metal salts;

(Hf) polyoxy-$C_2$-$C_4$-alkylene moieties which are terminated by hydroxyl groups, mono- or polyamino groups, at least one nitrogen atom having basic properties, or by carbamate groups;

(Hg) carboxylic ester groups;

(Hh) moieties which derive from succinic anhydride and have hydroxyl and/or amino and/or amido and/or imido groups; and/or (Hi) moieties obtained by Mannich reaction of substituted phenols with aldehydes and mono- or polyamines.

The hydrophobic hydrocarbon radical in the above detergent additives, which ensures the adequate solubility in the fuel oil composition, has a number-average molecular weight ($M_n$) of from 85 to 20000, especially from 300 to 5000, in particular from 500 to 2500. Typical hydrophobic hydrocarbon radicals, especially in conjunction with the polar moieties (Ha), (Hc), (Hh) and (Hi), include relatively long-chain alkyl or alkenyl groups, especially the polypropenyl, polybutenyl and polyisobutenyl radical, each having $M_n$=from 300 to 5000, especially from 500 to 2500, in particular from 700 to 2300.

Examples of the above groups of detergent additives include the following:

Additives comprising mono- or polyamino groups (Ha) are preferably polyalkenemono- or polyalkenepolyamines based on polypropene or conventional (i.e. having predominantly internal double bonds) polybutene or polyisobutene having $M_n$=from 300 to 5000. Such additives based on highly reactive polyisobutene, which can be prepared from the polyisobutene which may comprise up to 20% by weight of n-butene units by hydroformylation and reductive amination with ammonia, monoamines or polyamines, such as 3-(N,N-dimethylamino)propylamine, ethylenediamine, diethylenetriamine, triethylenetetramine or tetraethylenepentamine, are disclosed in particular in EP-A 244 616. When polybutene or polyisobutene having predominantly internal double bonds (usually in the β- and γ-position) is used as starting material in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or polyamines, such as dimethylaminopropylamine, ethylenediamine, diethylenetriamine, triethylenetetramine or tetraethylenepentamine. Corresponding additives based on polypropene are described in particular in WO-A-94/24231.

Further preferred additives comprising monoamino groups (Ha) are the hydrogenation products of the reaction products of polyisobutenes having an average degree of polymerization P of from 5 to 100 with nitrogen oxides or mixtures of nitrogen oxides and oxygen, as described in particular in WO-A-97/03946.

Further preferred additives comprising monoamino groups (Ha) are the compounds obtainable from polyisobutene epoxides by reaction with amines and subsequent dehydration and reduction of the amino alcohols, as described in particular in DE-A-196 20 262.

Additives comprising nitro groups (Hb), if appropriate in combination with hydroxyl groups, are preferably reaction products of polyisobutenes having an average degree of polymerization P=from 5 to 100 or from 10 to 100 with nitrogen oxides or mixtures of nitrogen oxides and oxygen, as described in particular in WO-A-96/03367 and WO-A-96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Hc) are in particular reaction products of polyisobutene epoxides obtainable from polyisobutene having preferably predominantly terminal double bonds and $M_n$=from 300 to 5000, with ammonia or mono- or polyamines, as described in particular in EP-A 476 485.

Additives comprising carboxyl groups or their alkali metal or alkaline earth metal salts (Hd) are preferably copolymers of $C_2$-$C_{40}$-olefins with maleic anhydride which have a total molar mass of from 500 to 20000 and of whose carboxyl groups some or all have been converted to the alkali metal or alkaline earth metal salts and any remainder of the carboxyl groups has been reacted with alcohols or amines. Such additives are disclosed in particular by EP-A-307 815. Such additives serve mainly to prevent valve seat wear and can, as described in WO-A-87/01126, advantageously be used in combination with customary fuel detergents such as poly(iso)buteneamines or polyetheramines.

Additives comprising sulfonic acid groups or their alkali metal or alkaline earth metal salts (He) are preferably alkali metal or alkaline earth metal salts of an alkyl sulfosuccinate, as described in particular in EP-A-639 632. Such additives serve mainly to prevent valve seat wear and can be used advantageously in combination with customary fuel detergents such as poly(iso)buteneamines or polyetheramines.

Additives comprising polyoxy-$C_2$-$C_4$-alkylene moieties (Hf) are preferably polyethers or polyetheramines which are obtainable by reaction of $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A-310 875, EP-A-356 725, EP-A-700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and also the corresponding reaction products with ammonia.

Additives comprising carboxylic ester groups (Hg) are preferably esters of mono-, di- or tricarboxylic acids with long-chain alkanols or polyols, in particular those having a minimum viscosity of 2 mm$^2$/s at 100° C., as described in particular in DE-A-38 38 918. The mono-, di- or tricarboxylic acids used may be aliphatic or aromatic acids, and particularly suitable ester alcohols or ester polyols are long-chain representatives having, for example, from 6 to 24 carbon atoms. Typical representatives of the esters are adipates, phthalates, isophthalates, terephthalates and trimellitates of isooctanol, of isononanol, of isodecanol and of isotridecanol. Such products also have carrier oil properties.

Additives comprising moieties derived from succinic anhydride and having hydroxyl and/or amino and/or amido and/or imido groups (Hh) are preferably corresponding derivatives of alkyl- or alkenyl-substituted succinic anhydride and especially the corresponding derivatives of polyisobutenylsuccinic anhydride which are obtainable by reacting conventional or highly reactive polyisobutene having $M_n$=from 300 to 5000 with maleic anhydride by a thermal route or via the chlorinated polyisobutene. Particular interest attaches to derivatives with aliphatic polyamines such as ethylenediamine, diethylenetriamine, triethylenetetramine or tetraethylenepentamine. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. Such fuel additives are described in particular in U.S. Pat. No. 4,849,572.

The detergent additives from group (Hh) are preferably the reaction products of alkyl- or alkenyl-substituted succinic anhydrides, especially of polyisobutenylsuccinic anhydrides, with amines and/or alcohols. These are thus derivatives which are derived from alkyl-, alkenyl- or polyisobutenylsuccinic anhydride and have amino and/or amido and/or imido and/or hydroxyl groups. It will be appreciated that these reaction products are not only obtainable when substituted succinic anhydride is used, but also when substituted succinic acid or suitable acid derivatives, such as succinyl halides or succinic esters, are used.

When the additized fuel comprises a detergent based on a polyisobutenyl-substituted succinimide, the imides with aliphatic polyamines are especially of interest. Particularly preferred polyamines are ethylenediamine, diethylenetriamine, triethylenetetramine, pentaethylenehexamine and in particular tetraethylenepentamine. The polyisobutenyl radical has a number-average molecular weight $M_n$ of preferably from 500 to 5000, more preferably from 500 to 2000 and in particular of about 1000.

Additives comprising moieties (Hi) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may stem from conventional or highly reactive polyisobutene having $M_n$=from 300 to 5000. Such "polyisobutene-Mannich bases" are described in particular in EP-A-831 141.

Preference is given to using the detergent additives (H) mentioned together with the inventive additive formulation in combination with at least one carrier oil.

Suitable mineral carrier oils are the fractions obtained in crude oil processing, such as brightstock or base oils having viscosities, for example, from the SN 500-2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of abovementioned mineral carrier oils.

Examples of suitable synthetic carrier oils are selected from: polyolefins (poly-alpha-olefins or poly(internal olefin)s), (poly)esters, (poly)alkoxylates, polyethers, aliphatic polyetheramines, alkylphenol-started polyethers, alkylphenol-started polyetheramines and carboxylic esters of long-chain alkanols.

Examples of suitable polyolefins are olefin polymers having $M_n$=from 400 to 1800, in particular based on polybutene or polyisobutene (hydrogenated or unhydrogenated).

Examples of suitable polyethers or polyetheramines are preferably compounds comprising polyoxy-$C_2$-$C_4$-alkylene moieties which are obtainable by reacting $C_2$-$C_{60}$-alkanols, $C_6$-$C_{30}$-alkanediols, mono- or di-$C_2$-$C_{30}$-alkylamines, cyclohexanols or $C_1$-$C_{30}$-alkylphenols with from 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described in particular in EP-A-310 875, EP-A-356 725, EP-A-700 985 and U.S. Pat. No. 4,877,416. For example, the polyetheramines used may be poly-$C_2$-$C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are in particular esters of mono-, di- or tricarboxylic acids with long-chain alkanols or polyols, as described in particular in DE-A-38 38 918. The mono-, di- or tricarboxylic acids used may be aliphatic or aromatic acids; suitable ester alcohols or polyols are in particular long-chain representatives having, for example, from 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A-38 26 608, DE-A-41 42 241, DE-A-43 09 074, EP-A-0 452 328 and EP-A-0 548 617.

Examples of particularly suitable synthetic carrier oils are alcohol-started polyethers having from about 5 to 35, for example from about 5 to 30, $C_3$-$C_6$-alkylene oxide units, for example selected from propylene oxide, n-butylene oxide and isobutylene oxide units, or mixtures thereof. Nonlimiting examples of suitable starter alcohols are long-chain alkanols or phenols substituted by long-chain alkyl in which the long-chain alkyl radical is in particular a straight-chain or branched $C_6$-$C_{18}$-alkyl radical. Preferred examples include tridecanol and nonylphenol.

Further suitable synthetic carrier oils are alkoxylated alkylphenols, as described in DE-A-101 02 913.

Preferred carrier oils are synthetic carrier oils, particular preference being given to polyethers.

The detergent additive (H) or a mixture of different such detergent additives is added to the additized fuel in a total amount of preferably from 10 to 2000 ppm by weight, more preferably from 20 to 1000 ppm by weight, even more preferably from 50 to 500 ppm by weight and in particular from 50 to 200 ppm by weight, for example from 70 to 150 ppm by weight.

When a carrier oil is used additionally, it is added to the inventive additized fuel in an amount of preferably from 1 to 1000 ppm by weight, more preferably from 10 to 500 ppm by weight and in particular from 20 to 100 ppm by weight.

Cold flow improvers suitable as further coadditives are, for example, copolymers of ethylene with at least one further unsaturated monomer, for example ethylene-vinyl acetate copolymers.

Corrosion inhibitors suitable as further coadditives are, for example, succinic esters, in particular with polyols, fatty acid derivatives, for example oleic esters, oligomerized fatty acids and substituted ethanolamines.

Demulsifiers suitable as further coadditives are, for example, the alkali metal and alkaline earth metal salts of alkyl-substituted phenol- and naphthalenesulfonates and the alkali metal and alkaline earth metal salts of fatty acid, and also alcohol alkoxylates, e.g. alcohol ethoxylates, phenol alkoxylates, e.g. tert-butylphenol ethoxylates or tert-pentylphenol ethoxylates, fatty acid, alkylphenols, condensation products of ethylene oxide and propylene oxide, e.g. ethylene oxide-propylene oxide block copolymers, polyethyleneimines and polysiloxanes.

Dehazers suitable as further coadditives are, for example, alkoxylated phenolformaldehyde condensates.

Antifoams suitable as further coadditives are, for example, polyether-modified polysiloxanes.

Cetane number and combustion improvers suitable as further coadditives are, for example, alkyl nitrates, e.g. cyclohexyl nitrate and especially 2-ethylhexyl nitrate, and peroxides, e.g. di-tert-butyl peroxide.

Antioxidants suitable as further coadditives are, for example, substituted phenols, e.g. 2,6-di-tert-butylphenol and 2,6-di-tert-butyl-3-methylphenol, and also phenylenediamines, e.g. N,N'-di-sec-butyl-p-phenylenediamine.

Metal deactivators suitable as further coadditives are, for example, salicylic acid derivatives, e.g. N,N'-disalicylidene-1,2-propanediamine.

Suitable solvents, especially for diesel additive packages, are, for example, nonpolar organic solvents, especially aromatic and aliphatic hydrocarbons, for example toluene, xylenes, "white spirit" and the technical solvent mixtures of the designations Shellsol® (manufacturer: Royal Dutch/Shell Group), Exxol® (manufacturer: ExxonMobil) and Solvent Naphtha. Also useful here, especially in a blend with the nonpolar organic solvents mentioned, are polar organic solvents, in particular alcohols such as 2-ethylhexanol, 2-propylheptanol, decanol and isotridecanol.

When the coadditives and/or solvents mentioned are used additionally in gasoline fuel or diesel fuel, they are used in the amounts customary therefor.

The inventive additive formulation described is moreover also suitable in an advantageous manner for antistatic modification and improving the lubricity of lubricants. Lubricants or lubricant compositions shall refer here to motor oils, lubricant oils, hydraulic oils, turbine oils, regulator oils, transmission oils including manual and automatic oils, calendering oils, heat carrier oils, metalworking oils, shock absorber oils and related liquid compositions which serve to lubricate mechanically moving parts—usually as metal. Moreover, lubricant greases shall also be included in the lubricants.

The economically most significant lubricant compositions are motor oils, and also transmission oils including manual and automatic oils. Motor oils consist typically of mineral base oils which comprise predominantly paraffinic constituents and are produced in the refinery by costly inconvenient workup and purification processes, having a fraction of from approx. 2 to 10% by weight of additives (based on the active substance contents). For specific applications, for example high-temperature applications, the mineral base oils may be replaced partly or fully by synthetic components such as organic esters, synthetic hydrocarbons such as olefin oligomers, poly-α-olefins or polyolefins of hydrocracking oils. Motor oils also have to have sufficiently high viscosities at high temperatures in order to ensure impeccable lubrication effect and good sealing between cylinder and piston. Moreover, the flow properties of motor oils have to be such that the engine can be started without any problem at low temperatures. Motor oils have to be oxidation-stable and must generate only small amounts of decomposition products in liquid or solid form and deposits even under difficult working conditions. Motor oils disperse solids (dispersant behavior), prevent deposits (detergent behavior), neutralize acidic reaction products and form a wear protective film on the metal surfaces in the engine. Motor oils are typically characterized by viscosity classes (SAE classes).

With regard to their base components and additives, transmission oils including manual and automatic oils have a similar composition to motor oils. The force is transmitted in the gear system of gearboxes to a high degree through the liquid pressure in the transmission oil between the teeth. The transmission oil accordingly has to be such that it withstands high pressures for prolonged periods without decomposing. In addition to the viscosity properties, wear, pressure resistance, friction, shear stability, traction and running-in performance are the crucial parameters here.

In addition to the inventive additive formulation to be used in the context of the present invention, motor oils and transmission oils including manual and automatic oils generally also comprise at least one, but usually some or all, of the additives listed below in the amounts customary therefor (which are stated in brackets in % by weight, based on the overall lubricant composition):

(a) antioxidants (from 0.1 to 5%): sulfur compounds, for example reaction products of terpenes (α-pinene), resin oils or low molecular weight polybutenes with sulfur, dialkyl sulfides, dialkyl trisulfides, polysulfides, diaryl sulfides, modified thiols, mercaptobenzimidaoles, mercaptotriazines, thiophene derivatives, xanthates, zinc dialkyldithiocarbamates, thioglycols, thioaldehydes, dibenzyl disulfide, alkylphenol sulfides, dialkylphenol sulfides or sulfur-containing carboxylic acids phosphorus compounds, for example triaryl and trialkyl phosphites, dialkyl 3,5-di-tert-butyl-4-hydroxybenzylphosphonate or phosphonic acid piperazides sulfur-phosphorus compounds, for example zinc dialkyldithiophosphates (metal dialkyldithiophosphates also act as corrosion inhibitors and high-pressure additives in lubricant oils) or reaction products of phosphorus pentasulfide with terpenes (α-pinene, dipentene), polybutenes, olefins or unsaturated esters phenol derivatives, for example sterically hindered mono-, bis- or trisphenols, sterically hindered polycyclic phenols, polyalkylphenols, 2,6-di-tert-butyl-4-methylphenol or methylene-4,4'-bis(2,6-di-tert-butylphenol) (phenol derivatives are often used in combination with sulfur-based or amine-based antioxidants)

amines, for example arylamines such as diphenylamine, phenyl-α-naphthylamine or 4,4'-tetramethyldiaminodiphenylmethane metal deactivators in the narrower sense, for example N-salicylideneethylamine, N,N'-disalicylideneethylenediamine, N,N'-disalicylidene-1,2-propanediamine, triethylenediamine, ethylenediaminetetraacetic acid, phosphoric acid, citric acid, glycolic acid, lecithin, thiadiazole, imidazole or pyrazole derivatives (b) viscosity index improvers (from 0.05 to 10%), for example: polyisobutenes having a molecular weight of typically from 10000 to 45000, polymethacrylates having a molecular weight of typically from 15000 to 100000, homo- and copolymers of 1,3-dienes such as butadiene or isoprene having a molecular weight of typically from 80000 to 100000, 1,3-diene-styrene copolymers having a molecular weight of typically from 80000 to 100000, maleic anhydride-styrene polymers in esterified form having a molecular weight of typically from 60000 to 120000, star-shaped polymers with block-like structure by virtue of units composed of conjugated dienes and aromatic monomers having a molecular weight of typically from 200000 to 500000, polyalkylstyrenes having a molecular weight of typically from 80000 to 150000, polyolefins composed of ethylene and propylene or styrene-cyclopentadiene-norbornene terpolymers having a molecular weight of typically from 60000 to 140000

(c) pour point depressants (cold flow improvers) (from 0.03 to 1%), for example bicyclic aromatics such as naphthalene with different long-chain alkyl radicals, polymethacrylates with from 12 to 18 carbon atoms in the alcohol radical, a degree of branching between 10 to 30 mol % and an average molecular weight of from 5000 to 500000, long-chain alkylohenols and dialkylaryl phthalates or copolymers of different olefins (d) detergents (HD additives) (from 0.2 to 4%), for example calcium naphthenates, lead naphthenates, zinc naphthenates and manganese naphthenates, calcium dichlorostearates, calcium phenyl stearates, calcium chlorophenylstearates, sulfonation products of alkylaromatics such as dodecylbenzene, petroleum sulfonates, sodium sulfonates, calcium sulfonates, barium sulfonates or magnesium sulfonates, neutral, basic and overbased sulfonates, phenates and carboxylates, salicylates, metal salts of alkylphenols and alkylphenol sulfides, phosphates, thiophosphates or alkenylphosphonic acid derivatives (e) ashless dispersants (from 0.5 to 10%), for example Mannich condensates of alkylphenol, formaldehyde and polyalkylenepolyamines, reaction products of polyisobutenylsuccinic anhydrides with polyhydroxyl compounds or polyamines, copolymers of alkyl methacrylates with diethylaminoethyl methacrylate, N-vinylpyrrolidone, N-vinylpyridine or 2-hydroxyethyl methacrylate or vinyl acetate-fumarate copolymers (f) high-pressure additives (extreme pressure additives) (from 0.2 to 2.5%), for example chlorinated paraffins with chlorine content from 40 to 70% by weight, chlorinated fatty acid (especially having trichloromethyl end groups), dialkyl hydrogenphosphites, triaryl phosphites, aryl phosphates such as tricresyl phosphate, dialkyl phosphates, triaryl phosphates such as tributyl phosphate, trialkylphosphines, diphosphoric esters, nitroaromatics, aminophenol derivatives of naphthenic acid, carbamic esters, dithiocarbamic acid derivatives, substituted 1,2,3-triazoles, mixtures of benzotriazole and alkylsuccinic anhydride or alkylmaleic anhydride, 1,2,4-thiadiazole polymers, morpholinobenzothiadiazole disulfide, chlorinated alkyl sulfides, sulfurized olefins, sulfurized chloronaphthalenes, chlorinated alkyl thiocarbonates, organic sulfides and polysulfides such as bis(4-chlorobenzyl) disulfide and tetrachlorodiphenyl sulfide, trichloroacrolein mercaptals or especially zinc dialkyldithiophosphates (ZDDPs)

(g) friction modifiers (from 0.05 to 1%), especially polar oil-soluble compounds which generate a thin layer on the frictional surface by adsorption, for example fatty alcohols, fatty amides, fatty acid salts, fatty acid alkyl esters or fatty acid glycerides (h) antifoam additives (from 0.0001 to 0.2%), for example liquid silicones such as polydimethylsiloxanes or polyethylene glycol ethers and sulfides (i) demulsifiers (from 0.1 to 1%), for example dinonylnaphthalenesulfonates in the form of their alkali metal and alkaline earth metal salts (j) corrosion inhibitors (also known as metal deactivators) (from 0.01 to 2%), for example tertiary amines and salts thereof, imino esters, amide oximes, diaminomethanes, derivatives of saturated or unsaturated fatty acids with alkanolamines, alkylamines, sarcosines, imidazolines, alkylbenzotriazoles, dimercaptothiadiazole derivatives, diaryl phosphates, thiophosphoric esters, neutral salts of primary n-$C_8$-$C_{18}$-alkylamines or cycloalkylamines with dialkyl phosphates having branched $C_5$-$C_{12}$-alkyl groups, neutral or basic alkaline earth metal sulfonates, zinc naphthenates, mono- and dialkylarylsulfonates, barium dinonylnaphthalenesulfonates, lanolin (wool fat), heavy metal salts of naphthenic acid, dicarboxylic acid, unsaturated fatty acids, hydroxy fatty acids, fatty acid esters, pentaerythrityl monooleates and sorbitan monooleates, O-stearoylalkanolamines, polyisobutenylsuccinic acid derivatives or zinc dialkyldithiophosphates and zinc dialkyldithiocarbamates (k) emulsifiers (from 0.01 to 1%), for example long-chain unsaturated, naturally occurring carboxylic acid, naphthenic acids, synthetic carboxylic acid, sulfonamides, N-oleylsarcosine, alkanesulfamidoacetic acid, dodecylbenzenesulfonate, long-chain alkylated ammonium salts such as dimethyldodecylbenzylammonium chloride, imidazolinium salts, alkyl-, alkylaryl-, acyl-, alkylamino- and acylaminopolyglycols or long-chain acylated mono- and diethanolamines (l) dyes and fluorescence additives (from 0.001 to 0.2%)

(m) preservatives (from 0.001 to 0.5%)

(n) odor improvers from 0.001 to 0.2%).

Typical ready-to-use motor oil compositions and transmission oil, including manual and automatic oil, compositions in the context of the present invention have the following composition, the data for the additives relating to the active substance contents and the sum of all components always adding up to 100% by weight:

from 80 to 99.3% by weight, in particular from 90 to 98% by weight of motor oil base or transmission oil, including manual and automatic oil, base (mineral base oils and/or synthetic components) including the fractions of solvent and diluent for the additives from 0.01 to 2000 ppm by weight, preferably from 0.1 to 1000 ppm by weight, in particular from 0.5 to 500 ppm by weight, especially from 1 to 350 ppm by weight, of the inventive additive formulation from 0.2 to 4% by weight, in particular from 1.3 to 2.5% by weight of detergents of group (d)

from 0.5 to 10% by weight, in particular from 1.3 to 6.5% by weight of dispersants of group (e)

from 0.1 to 5% by weight, in particular from 0.4 to 2.0% by weight of antioxidants of group (a) and/or high-pressure additives of group (0 and/or friction modifiers of group (g)

from 0.05 to 10% by weight, in particular from 0.2 to 1.0% by weight of viscosity index improvers of group (b)

from 0 to 2% by weight of other additives of groups (c) and (h) to (n).

One example of a chemical or physical process in which the inventive additive formulation can be used to prevent electrostatic charge is the polyethylene gas phase fluidized bed process. In this process, ethylene or a mixture of ethylene and comonomers such as 1-butene, 1-hexene or 1-octene is polymerized coordinately. The density of the polyethylene formed depends crucially on the amount and on the type of the comonomer incorporated. For instance, high-density HDPE is obtained preferentially from ethylene without comonomers, and low-density LLDPE in the presence of significant amounts of the abovementioned comonomers. The catalysts used are preferably silicon dioxide-supported Ziegler or metallocene catalysts. In each case, the polymerization is performed in a fluidized bed at a temperature below the melting point of the polyethylene, which is why solid product particles cause friction on the inner wall of the tower-shaped fluidized bed reactor. The inventive additive formulation serves to prevent the electrostatic charge in the entire reactor system and hence counteracts polymer deposit formation on the inner reactor wall and in the heat exchangers.

The present invention also provides antistatically modified inanimate organic material with improved electrical conductivity, which is selected from cosmetic preparations, medicament formulations, photographic recording materials, paints and varnishes, plastics, waxes, solvents, mineral oil products and fuels, and which comprises from 0.01 to 2000 ppm by weight, preferably from 0.1 to 1000 ppm by weight, in particular from 0.5 to 500 ppm by weight, especially from 1 to 350 ppm by weight, of the inventive additive formulation.

In comparison to the known compositions, the inventive additive formulation permits an even more effective and lasting increase in the electrical conductivity in inanimate organic material, especially in mineral oil products and fuels, in particular in turbine fuel, gasoline fuel and diesel fuel, and also in lubricants. In many cases, the electrical conductivity, even after storage, remains at a constantly high level, whereas a distinct decline in the values can be observed during storage with corresponding prior art additive formulations. Even with very small amounts in the range of a few ppm by weight, electrical conductivities of from at least 50 to 100 pS/m are generally achieved in fuels.

The inventive additive formulation has a high thermal stability. It is metal- and halogen-free. It also has a high flashpoint, and is therefore safe in the course of its preparation, its transport and its storage before its use in the inanimate organic material, i.e. it can be handled without explosion and fire risk.

The invention will be illustrated in detail with reference to the nonrestrictive examples which follow.

EXAMPLE 1

Preparation of a 1-decene-sulfur dioxide Copolymer at 25° C.

A 5 liter autoclave was initially charged with 1122 g (7.90 mol) of 1-decene and 28 g of dodecyl mercaptan in 350 g of Solvent Naphtha Heavy (Solvesso® 150). At from 10 to 20° C., 950 g (14.84 mol) of sulfur dioxide were introduced. Thereafter, the reaction mixture was adjusted to 25° C., and a solution of 72 g of tert-butyl peroxypivalate (75% strength by weight) in 700 g of Solvent Naphtha Heavy was introduced at this temperature over 3 hours. Subsequently, the mixture was stirred at 20° C. for a further 5 hours For workup, the autoclave was decompressed and degassing was effected first at standard pressure and then under reduced pressure (from 200 to 10 mbar). 2.4 kg of a clear viscous polymer solution were obtained. The conversion was 95% (determined by $^1$H NMR spectroscopy on the basis of the integral ratio of the 3 olefin protons of the residue olefin at 5.8 ppm/4.9 ppm to the 3 protons in the main polymer chain at 4.3-3.0 ppm). The 1-decene-sulfur dioxide copolymer thus obtained had a number-average molecular weight $M_n$ of 19600 and a polydispersity PDI of 3.2.

EXAMPLE 2

Preparation of a 1-decene-sulfur dioxide Copolymer at 35° C.

A 5 liter autoclave was initially charged with 1122 g (7.90 mol) of 1-decene and 28 g of dodecyl mercaptan in 350 g of Solvent Naphtha Heavy (Solvesso® 150). At from 10 to 20° C., 950 g (14.84 mol) of sulfur dioxide were introduced. Thereafter, the reaction mixture was adjusted to 35° C., and a solution of 72 g of tert-butyl peroxypivalate (75% strength by weight) in 700 g of Solvent Naphtha Heavy was introduced at this temperature over 2 hours. Subsequently, the mixture was stirred at 20° C. for a further 4 hours. For workup, the autoclave was decompressed, and degassing was effected first at standard pressure and then under reduced pressure (from 200 to 10 mbar). 2.5 kg of a clear viscous polymer solution were obtained. The conversion was 97% (determined by $^1$H NMR spectroscopy on the basis of the integral ratio of the 3 olefin protons of the residue olefin at 5.8 ppm/4.9 ppm to the 3 protons in the main polymer chain at 4.3-3.0 ppm). The 1-decene-sulfur dioxide copolymer thus obtained had a number-average molecular weight $M_n$ of 13400 and a polydispersity PDI of 2.9.

EXAMPLE 3

Preparation of a 1-decene-sulfur dioxide Copolymer at 33° C.

A 5 liter autoclave was initially charged with 1122 g (7.90 mol) of 1-decene and 28 g of dodecyl mercaptan in 630 g of Solvent Naphtha Heavy (Solvesso® 150). At from 10 to 20° C., 720 g (11.25 moll of sulfur dioxide were introduced. Thereafter, the reaction mixture was adjusted to 33° C., and a solution of 88 g of tert-butyl peroxypivalate (75% strength by weight) in 420 g of Solvent Naphtha Heavy was introduced at this temperature over 2 hours. Subsequently, the mixture was stirred at 20° C. for a further 4 hours. For workup, the autoclave was decompressed, and degassing was effected first at standard pressure and then under reduced pressure (from 200 to 10 mbar). 2.5 kg of a clear viscous polymer solution were obtained. The conversion was 92% (determined by $^1$H NMR spectroscopy on the basis of the integral ratio of the 3 olefin protons of the residue olefin at 5.8 ppm/4.9 ppm to the 3 protons in the main polymer chain at 4.3-3.0 ppm). The 1-decene-sulfur dioxide copolymer thus obtained had a number-average molecular weight $M_n$ of 12500 and a polydispersity PDI of 2.5.

EXAMPLE 4

Preparation of an Additive Formulation from a 1-decene-sulfur dioxide Copolymer, a $C_{20/24}$-olefin-maleimide Copolymer, Dodecylbenzenesulfonic Acid and Solvent Naphtha Heavy 1 kg of the 1-decene-sulfur dioxide copolymer solution (50% strength by weight in Solvent Naphtha Heavy) from example 2 [component (A)] was mixed with a further 1.1 kg of Solvent Naphtha Heavy at from 25 to 35° C. with stirring.

Thereafter, 160 g of dodecylbenzenesulfonic acid [component (C)] were added at the same temperature with stirring and mixed homogeneously. This mixture was stirred at from 40 to 50° C. for 10 minutes. Subsequently 1 kg of a solution of $C_{20/24}$-olefin-maleic anhydride copolymer which had been converted to the imide with tallow fat-1,3-diaminopropane and had a weight-average molecular weight $M_w$ in the range from 2000 to 5000 [component (B)] in Solvent Naphtha Heavy (50% strength by weight) was added at a temperature of from 40 to 50° C. and mixed homogeneously. The resulting additive formulation had a composition of 15.3% by weight of (A), 15.3% by weight of (B), 4.9% by weight of (C) and 64.4% by weight of Solvent Naphtha Heavy [component (D)].

EXAMPLE 5

Preparation of an Additive Formulation from a 1-decene-sulfur dioxide Copolymer, a $C_{20/24}$-olefin-maleimide Copolymer, Dodecylbenzenesulfonic Acid and Solvent Naphtha Heavy The same components (A), (B), (C) and (D) were mixed in analogy to the formulation in example 4 in such ratios as to result in an additive formulation of the composition of 21% by weight of (A), 18% by weight of (B). 7% by weight of (C) and 54% by weight of (D).

EXAMPLE 6

Preparation of an Additive Formulation from a 1-decene-sulfur dioxide Copolymer, a $C_{20/24}$-olefin-maleimide Copolymer, Dodecylbenzenesulfonic Acid and Solvent Naphtha Heavy The same components (A), (B), (C) and (D) were mixed in analogy to the formulation in example 4 in such ratios as to result in an additive formulation of the composition of 14% by weight of (A), 13% by weight of (B), 5% by weight of (C) and 68% by weight of (D).

EXAMPLE 7 (for Comparison)

Preparation of an Additive Formulation from a 1-decene-sulfur dioxide Copolymer, an N-tallowfatamine/1,3-diaminopropane-epichlorohydrin Reaction Product, Dodecylbenzenesulfonic Acid and Solvent Naphtha Heavy A formulation analogous in the ratios of the four components to the formulation of example 6 was prepared, with the only difference that, instead of the 50% by weight $C_{20/24}$-Olefin-maleimide copolymer solution, the same amount of a commercially available 50% by weight solution of the polymeric condensation product of N-tallow-fatamine-1,3-diaminopropane and epichlorhydrin in a mixture of aromatic hydrocarbons—according to the teaching of document (1)— was used.

EXAMPLE 8

Measurement of the Conductivities of the Additive Formulations

Measurements of the electrical conductivity were carried out to DIN standard 51412-2 (field method). To this end, an immersion test cell was immersed into the liquids to be analyzed. The conductivity values in pS/m were each read off on the display of the immersion test cell at the same temperature of the liquids, specifically 25° C. The liquids to be analyzed were commercial petroleum, commercial diesel fuel, commercial heating oil, commercial turbine fuel and commercial hydraulic oil, into which a particular amount of the additive formulation had in each case been added as a conductivity improver beforehand. The overview which follows shows the results of the measurements.

a) n commercial petroleum (dosage: in each case 3 mg per liter):
the additive formulation from example 5 (inventive) gave 890 pS/m;
the additive formulation from example 6 (inventive) gave 750 pS/m;
the additive formulation from example 7 (for comparison) gave 540 pS/m;
a commercial antistat formulation (AF1) gave 760 pS/m;
b) in commercial diesel fuel (dosage: in each case 3 mg per liter):
the additive formulation from example 5 (inventive) gave 670 pS/m;
the additive formulation from example 6 (inventive) gave 440 pS/m;
a commercial antistat formulation (AF1) gave 415 pS/m;
c) in commercial heating oil (dosage: in each case 3 mg per liter):
the additive formulation from example 5 (inventive) gave 690 pS/m;
the additive formulation from example 6 (inventive) gave 520 pS/m;
a commercial antistat formulation (AF1) gave 505 pS/m;
d) in commercial turbine fuel (dosage: in each case 1, 3 or 5 mg per liter):
the additive formulation from example 5 (inventive) gave 174 pS/m at 1 mg per liter, 750 pS/m at 3 mg per liter, and 1275 pS/m at 5 mg per liter; after 4 days of storage time in each case, the conductivity measurements were repeated and gave values of 230 pS/m (at 1 mp per liter), 735 pS/m (at 3 mg per liter) and 1205 pS/m (at 5 mg per liter);
a commercial antistat formulation (AF2) gave 205 pS/m at 1 mg per liter, 723 pS/m at 3 mg per liter, and 1230 pS/m at 5 mg per liter; after 4 days of storage time in each case, the conductivity measurements were repeated and gave values of 150 pS/m (at 1 mg per liter), 677 pS/m (at 3 mg per liter) and 1034 pS/m (at 5 mg per liter);
e) in commercial hydraulic oil (dosage in each case 130 mg per liter):
the additive formulation from example 5 (inventive) gave 167 pS/m;
a commercial antistat formulation (AF1) gave 120 pS/m.

For the commercial antistat formulations for improving the electrical conductivity in organic liquids (AF1 and AF2), a composition according to the teaching of document (1) is adopted.

The test results show that the inventive additive formulations are at least on a par with the corresponding prior art additive formulations—within the precision of measurement of, as experience has shown, approx. ±10-20 pS/m; in most cases, however, they surpass them and afford the desired significantly higher electrical conductivities, especially also in direct comparison with comparative example 7. This is also true of inventive example 6, which has a comparatively high content of solvent (D), i.e. is relatively highly diluted, but nevertheless affords the sufficiently high electrical conductivities as are also achieved with a commercial antistat formulation. In the measurements in the turbine fuel, as a further advantage of the inventive additive formulation, it should be noted that the electrical conductivity of the turbine fuel, even after a certain storage time, remains constant at the high level—unlike the turbine fuel treated with commercial antistat formulation, whose conductivity declines significantly after said storage time.

EXAMPLE 9

Examination of Storage Stability and Flashpoint of Additive Formulations

The storage stabilities of the inventive additive formulations from example 5 and 6 and of commercial antistat formulations (AF1 and AF2) were after prolonged storage at a constant 40° C., assessed for cloudiness and possible formation of precipitates by visual examination. In all cases, the samples had no cloudiness or precipitates after 3 months of storage. The flashpoints of the samples used had been determined beforehand to the EN ISO standard 2719:2002 (measurement in a closed crucible according to Pensky-Martens): in the case of the inventive samples, they were 62° C. (example 5) and 63° C. (example 6), but significantly lower for the commercial antistat formulation at 21° C. (AF1) and <20° C. (AF2).

The invention claimed is:

1. An additive formulation suitable for antistatic modification and improving the electrical conductivity of inanimate organic material, consisting essentially of
    (A) from 1 to 50% by weight of an olefin-sulfur dioxide copolymer,
    (B) from 1 to 50% by weight of a compound which comprises one or more basic nitrogen atoms and at least one linear chain or branched hydrocarbon radical having at least four carbon atoms,
    (C) from 0.1 to 30% by weight of an oil-soluble acid and
    (D) from 1 to 80% by weight of an organic solvent which comprises at least 80% by weight of a mixture of aromatic hydrocarbons having from 9 to 20 carbon atoms, where at least 80% by weight of the organic solvent compounds have a boiling point of more than 150° C. at standard pressure,
    wherein the sum of components (A) to (D) is 100% by weight,
    the compound (B) does not comprise a free hydroxyl group, and
    a flash point of the additive formulation is not less than 62° C.

2. The additive formulation according to claim 1, consisting essentially of
    (A) from 10 to 30% by weight of component (A),
    (B) from 10 to 30% by weight of component (B),
    (C) from 2 to 15% by weight of component (C) and
    (D) from 40 to 78% by weight of component (D).

3. The additive formulation according to claim 1, in which component (A) is a copolymer of sulfur dioxide with one or more linear or branched 1-olefins having from 2 to 24 carbon atoms.

4. The additive formulation according to claim 1, in which component (A) has a number-average molecular weight $M_n$ of from 2000 to 1 000 000.

5. The additive formulation according to claim 1, in which component (A) comprises less than 15 mol % of olefin not converted in the copolymerization with the sulfur dioxide.

6. The additive formulation according to claim 1, in which component (B) is an α-olefin-maleimide copolymer having at least one basic nitrogen atom.

7. The additive formulation according to claim 6, in which component (B) is obtainable by free-radical polymerization of one or more linear or branched α-olefins having from 6 to 50 carbon atoms with maleic anhydride and subsequent reaction with one or more aliphatic polyamines.

8. The additive formulation according to claim 6, in which component (B) has a weight-average molecular weight $M_w$ of from 500 to 50 000.

9. The additive formulation according to claim 1, in which component (C) is an organic sulfonic acid which has a hydrocarbyl radical having from 6 to 40 carbon atoms.

10. The additive formulation according to claim 1, in which the aromatic hydrocarbon mixture of component (D) are compounds having from 9 to 14 carbon atoms.

11. A process for preparing the additive formulation according to claim 1, which comprises first mixing components (A) and (C) homogeneously with one another in the presence of at least a portion of the high-boiling organic solvent (D), and then incorporating component (B).

12. An antistatically modified inanimate organic material comprising from 0.01 to 2000 ppm by weight of the additive formulation according to claim 1, wherein the inanimate organic material is selected from the group consisting of cosmetic preparations, medicament formulations, photographic recording materials, paints and varnishes, plastics, waxes, solvents, mineral oil products and fuels.

* * * * *

UNITED STATES PATENT AND TRADEMARK OFFICE
CERTIFICATE OF CORRECTION

PATENT NO. : 10,062,471 B2
APPLICATION NO. : 14/329034
DATED : August 28, 2018
INVENTOR(S) : Dietmar Posselt et al.

It is certified that error appears in the above-identified patent and that said Letters Patent is hereby corrected as shown below:

On the Title Page

In Column 2, item (56), other publications, Line 1, delete "Sulfer" and insert -- Sulphur --, therefor.

In the Specification

In Column 18, Line 29, delete "mercaptobenzimidaoles," and insert -- mercaptobenzimidazoles, --, therefor.

In Column 19, Line 18, delete "alkylohenols" and insert -- alkylphenols --, therefor.

In Column 20, Line 56, delete "(0" and insert -- (f) --, therefor.

In Column 23, Line 54, delete "Olefin" and insert -- olefin --, therefor.

Signed and Sealed this
Second Day of June, 2020

Andrei Iancu
*Director of the United States Patent and Trademark Office*